3,148,968
BENDING GLASS SHEETS
James H. Cypher, New Kensington, and Clement E. Valchar, Tarentum, Pa., assignors to Pittsburgh Plate Glass Company, Pittsburgh, Pa., a corporation of Pennsylvania
No Drawing. Filed Mar. 8, 1962, Ser. No. 178,278
6 Claims. (Cl. 65—106)

The present invention relates to improvements in bending glass sheets by press bending heat-softened glass sheets into bent shapes, and particularly relates to an improved cover material for rigid shaping members which apply bending pressure to the opposite surfaces of heat-softened glass sheets.

Glass sheets have been bent either by heat-softening one or more flat glass sheets supported horizontally or obliquely over a suitable shaping surface until the glass conforms thereto by gravity sagging or by a method wherein the glass is heated to an elevated temperature and bending accelerated by applying pressure to one or both of the opposite major surfaces of each sheet by means of a pair of oppositely disposed, complementary shaped male and female pressing members. The pressing members act like forming dies that engage the opposite surfaces of the glass for a brief interval sufficient to shape the flat glass into its desired curvature. In this respect, the action is very much like that of a die-stamping operation. Such bending of glass has been termed "press bending" by the art.

Considerable difficulty has been met prior to the present invention in employing press bending. Metal shaping members or other materials having a high thermal conductivity could not be used to advantage because of their tendency to chill crack the glass. When pressing members of cast iron are heated, for example, they are subject to oxidation and other high temperature effects that cause the glass contacting surfaces to depart from their desired configuration and impose their imperfections in the viewing surfaces of the glass. Plaster of Paris molds can only tolerate limited temperatures and length of contact time.

As a consequence, the glass press bending art has employed fiberglass cloth coverings to insulate the surface of the press members from direct contact with the heated glass. Prior to the present invention, the art had suggested the use of a plurality of layers of woven fiberglass cloth impregnated with a highly heat resisting plastic material filling the interstices of the woven fiberglass cloth. U.S. Patent No. 2,560,599 to Joseph D. Ryan shows this teaching.

Despite this precaution, the woven fiberglass cloth surface presented its imprint to the heat-softened glass sheet surface. Pressurized contact impressed the overall effect of the woven fiberglass cloth on the glass surface. In addition, glass sheets shaped by pressing members having woven fiberglass cloth covers were characterized by a defect known as "chill ripple distortion." This defect resulted from the non-uniform refractive index of the pressed glass surfaces caused by non-uniform cooling of the glass surfaces undergoing shaping.

In addition to the optical marring that results from the above defects, woven fiberglass cloth is susceptible of breakage due to the weak tensile strength of its fibers. It is necessary to stretch woven fiberglass cloth over the pressing members in order to minimize defects due to wrinkling of the cover. Intermittent contact of the fiberglass cloth covers with glass sheets causes the glass fibers to stretch. Individual glass fibers break at only 3 percent elongation. Hence, frequent replacement of the impregnated woven fiberglass was required. This frequent replacement caused frequent interruptions in production.

The present invention has discovered that fiberglass cloth covers for press bending molds can have a longer life than those of the prior art and have less tendency to mar the major glass surfaces if they are fabricated by knitting rather than weaving. When fiberglass cloth is woven, the warp and the filling threads, which comprise the woven cloth, interlace with one another. The warp threads extend substantially linearly in one general direction while the filling threads extend substantially linearly in another general direction that intersects the general linear direction of the warp threads. In woven fabrics, the diameter of the filling threads determines the amplitude the warp threads deviate from a straight line while the diameter of the warp threads determines the amplitude of the deviation of the filling threads from straight lines.

Such covers are susceptible of imparting a nonuniform pressure pattern to the heat-softened glass as the glass is pressed. A series of high pressure points located at each intersection of the warp threads and filling threads characterizes this pressure pattern. The imprint of the fiberglass fabric is especially noticeable in the bent glass at these high pressure points.

Knit fabrics differ greatly from woven fabrics and nonwoven fabrics. Instead of having an interlacing of a series of lengthwise and crosswise threads as in woven fabrics or a series of webs or layers of fabric bonded together as in nonwoven fabrics, knitting, in its simplest form consists of forming loops of yarn and drawing other loops through those previously formed. The knitted fabric structure consists of a pattern of intersecting loops. When knitted covers are employed as faces for glass pressing dies as suggested by the present invention, the loops of the fabric contact the glass.

Knitted fiberglass material can be made on either flat or circular knitting machines. All general types of knitted material, such as plain, ribbed, lockstitch and mesh or warp-knits, such as tricot and milanese, are vastly superior to woven fiberglass material for pressing mold covers. The reason for this superiority is that all knit fabrics have elasticity and recovery properties in all directions. These properties are absent from woven and nonwoven fabrics.

The knitted fabrics preferred for use in the present invention consist throughout their structure of a multiplicity of loops and loop linkages that are bound to each other, ahead and behind, to the right and to the left. A normal loosely knit loop consists of two jointed S forms. It is also preferred that the linkages from loop to loop follow continuous S paths. Cross linkages other than of S shape lessen the elasticity of the fabric in proportion to their concentration.

It is a desideratum of the present invention to employ a fabric having maximum possible elasticity and recovery properties. It has been found that a flat stitch of weft knit type of knitting yields superior results in both appearance of the press bent glass and in durability of the fiberglass cover. The ideal stitch is a loop that is symmetrical in form, covering the same space in both horizontal and vertical directions.

Knit fabrics are capable of stretching in any direction to a gretater extent than woven or nonwoven fabrics. Knit fabrics stretch by distorting the configuration of their loosely knit intersection loops. Hence, knit fabrics are more capable of conforming to the complex shapes of the shaping surfaces of complementary glass pressing members than woven or nonwoven fabrics.

Loosely knit fiber glass cloth covers are draped over the shaping surfaces of the pressing members and secured to a pair of frames surrounding and attached to the pressing members. The cover for the convex pressing member is draped in intimate contact with the contour of its convex shaping surface. The cover secured to the frame attached to the concave shaping member conforms to the concave shaping surface when the hot glass is engaged due to the elasticity and recovery properties of the knit fiberglass cloth cover.

When the knit fiberglass cloth is stretched to its limit, it is no longer superior to a woven or nonwoven fiberglass cloth cover. Particularly superior glass products are produced from press members having open knit fiberglass cloth covers composed of bulky or textured yarns, for example, those having textured surface characteristic of those described in U.S. Patent No. 2,783,609, issued on March 5, 1957, to Alvin L. Breen, and the like.

The advantages of knit fiberglass cloth covers over the woven fiberglass cloth covers previously employed are as follows:

(1) Knit cloth with open loops is more resilient and has better recovery properties than woven or nonwoven cloth and conforms more precisely to the shaping surface than woven or nonwoven cloth. This characteristic lessens the likelihood that the cover will wrinkle.

(2) Knit fiberglass cloth encloses a greater volume of dead air space than woven fiberglass cloth because of the looped configuration of knit fabrics. The air spaces provide improved thermal insulation compared to that provided by woven or nonwoven fiberglass cloth. Therefore, fewer layers of knit fiberglass cloth are required than for woven or nonwoven fiberglass cloth to provide sufficient thermal insulation to insure against chill cracking. As few as two layers of knit fiberglass cloth over the convex shaping surface and one layer over the concave shaping surface of the complementary members gave satisfactory protection against chill cracking.

(3) When the yarn comprising the knit cloth is composed of bulky or texturized yarns, the texture of the yarn further improves the thermal insulation properties of the fiberglass cloth and further reduces the likelihood of imposing the overall pattern of the cover on the glass.

(4) Knit fiberglass cloth has a longer life expectancy than woven fiberglass cloth, because the knit fiberglass cloth loops maintain their resiliency even after repeated contact with hot glass under conditions such that the individual fibers of woven or nonwoven cloths would elongate to their point of rupture. This resiliency of the loops maintains the knit fiber cloth in intimate contact with the adjacent surface of the pressing members at elevated temperatures. Woven fiber cloth does not have such resiliency and, therefore, tends to stretch out of intimate contact with the shaping surface of the pressing members, thereby inducing wrinkling of the fiberglass cloth. This wrinkling induces wrinkles in the viewing surfaces of the pressed glass and also accelerates rupture of the yarn.

EXAMPLE

In order to determine the feasibility of the present invention, curved sidelights of tempered glass having a nominal thickness of ¼ inch bent to a uniform radius of curvature 60 inches were produced by gradual heating for a period of about 4 minutes in a tunnel-like furnace maintained at 1250 degrees Fahrenheit. This was followed by removing the glass from the furnace into a glass shaping station. About 4 seconds were required for this movement. Then glass shaping members located on opposite sides of the vertically supported glass sheets moved into pressurized contact with the opposite surfaces of the glass sheet. It took about 2 seconds for the glass shaping members to close and impress their shapes onto the opposite major surfaces of the heat-softened glass sheet.

The shaping members were held in pressurized contact with the opposite surfaces of the glass sheet for about 2 seconds and then were retracted to receive a subsequent heat-softened glass sheet therebetween for shaping. The glass sheets were immediately transported from the pressing station to a quenching station where air blasts were directed against the opposite major surfaces to quench the glass and impart a temper thereto. After the glass sheets were chilled, they were inspected for surface markings.

The glass shaping members were made of cast iron with various fiberglass cloth coverings, some knit and others woven, mounted in intimate contact with the complementary shaping surfaces thereof. Optical inspection of the bent glass provided a test for the various woven and knitted fiberglass cloths employed as covers for the glass pressing members.

Glass press bending molds provided with the fiberglass cover materials enumerated in Table I below produced bent glass sheets whose optical properties were tested. The best optical properties were obtained using cover material I, with cover material II also furnishing excellent results. The cover materials are listed in their order of preference with cover material I the best and cover material IV the worst of those listed. The optical properties of bent glass sheets produced using cover materials III and IV did not meet present commercial requirements.

*Table I.—Cover Material*

(I)

Knit fiberglass cloth
28 gauge (18⅔ needles per inch)
26 stitch or courses per inch
Made of fiberglass yarn 150-1/0-1.0 Z DE
About 10 percent textured (II)

Plain Jersey Knit fiberglass cloth
18 gauge (12 needles per inch)
18 courses per inch
Fiberglass yarn 150-1/2-3.8 S
About 10 percent textured (III)

Nontexturized woven fiberglass cloth Type ECC 181
57 ends per inch x 54 picks per inch
225-1/3 warp and fill yarns
8 Harness satin weave (IV)

Nontexturized woven fiberglass cloth Type ECC 184
42 ends per inch x 36 picks per inch
225-4/3 warp and fill yarns
8 Harness satin weave From the above experiments, it was concluded that a knit fabric was preferred to a woven fabric. The best fiberglass covers were those having texturized knit fabrics.

Further experiments on knit fiber glass covers determined the upper and lower limits for the looseness or tightness of knit required for superior results. The radius of curvature determines the optimum closeness of knit and yarn diameter. Finer yarns and closer knits are needed for a given weight fabric cover for a pressing mold producing a sharp curve than for one producing a shallow curve.

Generally, the knitting pattern must not be either too loose or too tight. If it is too loose, the spacing between adjacent loops causes the knit fabric to fail to provide a suitable uniform insulation. The hot glass surface is distorted as when using woven or nonwoven fiberglass covers having insufficient insulation uniformity.

On the other hand, if the knitting pattern is too tight, the properties of elasticity and recovery of the individual loops is reduced to such an extent that the knitted material is no longer vastly superior to woven or nonwoven cloths.

While the yarn diameter determines how tightly or loosely a fiberglass cloth may be knit, the number of permutations and combinations of yarn diameters and knitting patterns possible is so great that a comprehensive survey of all possibilities is impossible. Therefore, only a couple of ranges of illustrative plain jersey knits will be given hereinafter in order to guide the art in the obtention of superior knit fiberglass cloth covers.

As an example, 150-1/2-3.8 S fiberglass yarn is suitable as a cover to minimize cloth marking of the pressed glass surfaces in a range of about 9 courses to about 30 courses. Generally, heavier gauge yarns are more loosely knit than lighter gauge yarns. For example, a 30 gauge cloth (20 needles per inch) of this material works excellently when it is knit with about 20 to 30 courses per inch, and a 12 gauge cloth (8 needles per inch) preferably is knit with about 9 to 12 courses per inch. Fabrics of 6 needles per inch and less of this yarn are generally not suitable as covers because they mark heat-softened glass with their imprint.

A larger number of courses is desirable for a finer yarn, such as 150-1/0-1.0 Z. Suitable covers result when this finer yarn is knit into fabrics of from about 12 to about 36 courses. A suggested range for a 12 course fabric of this yarn is about 15 gauge minimum (10 needles per inch) and up, whereas for a 36 course fabric of this fine yarn, a range of 20 to 30 gauge is suggested.

The amount of insulation required for the convex shaping member is greater than that required for the concave shaping member. In the past, several layers of woven fiberglass cloth were required to furnish sufficient thermal insulation for each of the shaping members. Substitution of knit fiberglass cloth for the prior art woven fiberglass cloth has resulted in the need for fewer layers on the shaping surfaces of the shaping members.

Because the glass sheet surface facing the convex shaping member is in contact with more area of the shaping surface than the glass sheet surface facing the concave shaping member for a considerable portion of the pressing cycle, more insulation is needed between the glass and the convex shaping member than between the glass and the concave shaping member.

Only two layers of knit fiberglass cloth were required to be superimposed on the convex shaping surface and only one layer on the concave shaping surface to provide satisfactory protection against chill cracking. It is recommended that at least one more layer of knit fiberglass cloth be interposed between one surface of the glass sheet facing the convex pressing member than between the other surface of the glass sheet facing the concave pressing member.

The present invention has been described for the purposes of illustration rather than limitation. It is understood that many variations of knit fiber glass cloth may be employed between the shaping surface of a pressing member and the glass sheet to be shaped into conformance with the shape of the complementary pressing members within the purview of this invention provided the knit fiberglass fabric employed has the requisite properties of thermal insulation, elasticity and recovery not found in the prior art woven fabrics. Reference to the scope of the present invention may be obtained from the claimed subject matter which follows.

What is claimed is:

1. In the art of bending heat-softened glass sheets wherein a heat-softened glass sheet is shaped by pressurized contact between a pair of shaping members having substantially complementary shaping surfaces opposing one another, the improvement comprising interposing knit fiberglass fabric between each shaping surface and each major surface of the heat-softened glass sheet in such a manner that the fabric retains elasticity while applying pressure to the heat-softened glass sheet.

2. The improvement according to claim 1, wherein the yarn of the knit fiberglass fabric is textured.

3. The improvement according to claim 1, wherein the fabric is a flat knit.

4. The improvement according to claim 3, wherein the yarn of the flat knit fiberglass fabric is textured.

5. The improvement according to claim 1, wherein said knit fiberglass cloth is applied in intimate contact with said shaping surface.

6. The improvement according to claim 1, wherein said complementary shaping surfaces are convex and concave, comprising interposing at least one more layer of knit fiber glass cloth between said convex shaping surface and one surface of the glass sheet than the number of layers of knit fiber glass cloth interposed between said concave shaping surface and the other surface of the glass sheet.

References Cited in the file of this patent

UNITED STATES PATENTS 2,560,599    Ryan _____ July 17, 1951